United States Patent [19]
Mitchell

[11] 3,747,423
[45] July 24, 1973

[54] TORQUE MEASURING WRENCH
[75] Inventor: Wallace F. Mitchell, Arlington Heights, Ill.
[73] Assignee: Ammco Tools, Inc., North Chicago, Ill.
[22] Filed: Nov. 17, 1971
[21] Appl. No.: 199,491

[52] U.S. Cl. .................................................. 73/139
[51] Int. Cl. ............................................. B25b 23/14
[58] Field of Search ............................... 73/139, 1 C

[56] References Cited
UNITED STATES PATENTS
2,400,978   5/1946   Collins................................. 73/139
2,269,503   1/1942   Zimmerman......................... 73/139
3,364,725   1/1968   Grabovac............................. 73/1 C

*Primary Examiner*—James J. Gill
*Attorney*—Raymond E. Fidler, Edmond T. Patnaude et al.

[57] ABSTRACT

A torque measuring wrench includes a spring bar interconnected between a socket and the wrench housing in which the socket is rotatably mounted, and an adjustably movable and lockable calibration block connects the spring bar to the housing.

4 Claims, 3 Drawing Figures

PATENTED JUL 24 1973                                        3,747,423

TORQUE MEASURING WRENCH

The present invention generally relates to torque measuring wrenches of the type employing spring bars for limiting the rotational movement of a socket member in the housing, and it relates more particularly to a new and improved torque measuring wrench having an adjustably movable and lockable calibration block connecting a spring bar to the housing, and to a method of calibrating a torque measuring wrench.

BACKGROUND OF THE INVENTION

One of the better torque measuring wrench designs is disclosed in U.S. Pat. No. 2,320,023. It includes a tool receiving socket member rotatably mounted in a rigid housing and restrained from movement by a spring bar connected between the socket member and a remote location in the housing. The effective length of the spring bar between the socket and the housing is determinitive of the torque required to rotate the socket in the housing. A problem long associated with this wrench construction, however, has been the difficulty of accurately calibrating it, thereby appreciably increasing the manufacturing cost thereof.

OBJECTS OF THE INVENTION

Therefore, an object of the present invention is to provide a new and improved method and means for calibrating a torque measuring wrench.

Another object of this invention is to provide a new and improved method and means for calibrating a torque measuring wrench of the type heretofore described.

A further object of this invention is to provide a new and improved device for precisely adjusting the effective length of a spring bar.

SUMMARY OF THE INVENTION

Briefly, the above and further objects may be realized in accordance with the present invention by slidably mounting a calibration block in the wrench housing, the said block being bored to receive the spring bar and being provided with oppositely sloping external surfaces engaged by set screws extending through the housing. By loosening one screw and tightening the other the block may be moved in either direction longitudinally of the housing to adjust the effective length of the spring bar.

BRIEF DESCRIPTION OF THE DRAWING

Further objects and advantages and a better understanding of the invention may be had from the following detailed description taken in connection with the accompanying drawing, wherein.

DETAILED DESCRIPTION OF THE INVENTION

Figure 1:
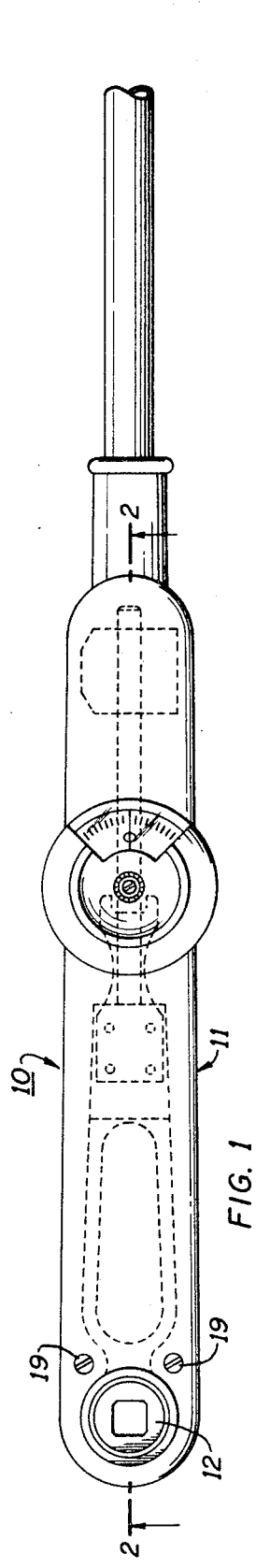
FIG. 1 is a plan view of a torque measuring wrench embodying the present invention.
Figure 2:
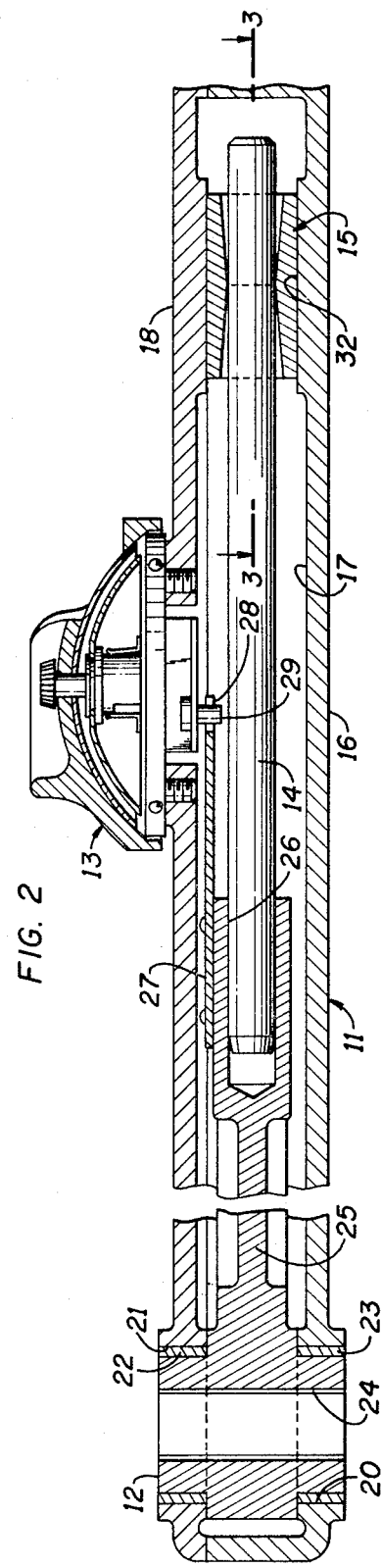
FIG. 2 is a fragmentary sectional view taken along the line 2—2 of FIG. 1.
Figure 3:
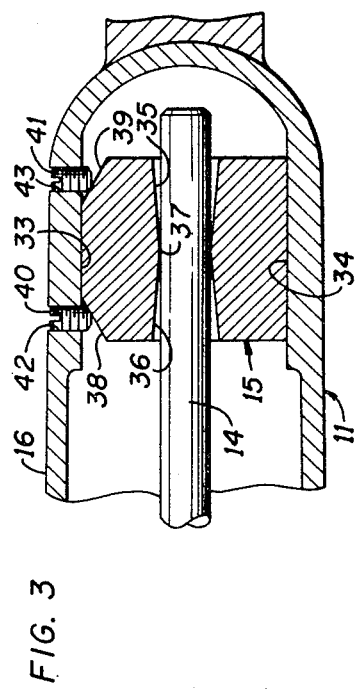
FIG. 3 is an enlarged, sectional view taken along the line 3—3 of FIG. 2 to show the calibration block assembly.

Referring now to the drawing and particularly to FIGS. 1 and 2 thereof, a torque measuring wrench 10 comprises as its principal elements an elongated housing 11, a wrench receiving socket member 12 rotatably journaled near one end of the housing, a torque indicating assembly 13 fixedly mounted to the housing 11 and connected to the socket part 12, a spring bar 14 connected at one end to the socket member 12, and a calibration block 15 connecting the spring bar 14 to the housing 11. As is described in greater detail hereinafter, the calibration block 15 is adjustable along the longitudinal axis of the spring bar 14 to adjust the effective length thereof.

Considered in greater detail the housing 11 includes a body portion 16 having an elongated generally rectangular recess 17 therein, and a cover member 18 which fits over the recess 17 in the body member 16 and is secured thereto by a plurality of machine screws 19. The housing parts 16 and 18 are respectively provided with aligned circular holes 20 and 21 in which a pair of bushings 22 and 23 are mounted for rotatably receiving aligned shaft portions of the socket member 12. A square hole 24 extends through the socket part 12 for receiving an element by which the wrench may be engaged with the work. The socket member 12 includes a rearwardly extending, integral arm 25 provided with an axially disposed bore 26 in which the forward end portion of the spring bar 14 is press fitted. An arm 27 is fixedly connected to the socket member 12 and is provided with a bifurcated distal end 28 which straddles a pin 29 depending from the torque indicating assembly 13. The assembly 13 is fully described in U.S. Pat. No. 2,320,023 and indicates on the face thereof the torque applied through the housing 11 to the socket member 12 and thus to the work. More particularly, the indicating assembly 13 is responsive to the movement of the pin 29 relative to the housing, and since such movement is directly proportional to the torque, the dial of the assembly 13 is calibrated in terms of torque.

The rearward end portion of the housing member 16 is provided with a generally rectangular, smooth guide channel including a flat bottom wall 32 and a pair of upstanding sidewalls 33 and 34 for slidably receiving the calibration block 15. the block 15 is provided with a central bore in which the rearward end portion of the spring bar 14 is slidably received. Preferably the bore in the calibration block 15 comprises inwardly divergent end portions 35 and 36 meeting at a narrow annular area 37 having an internal diameter but slightly larger than the external diameter of the spring bar 14 thereby providing a pivot bearing for the rear end portion of the spring bar 14.

In order to permit precise axial adjustment of the calibration block 15 relative to the spring bar 14, a pair of oppositely sloping external surfaces 38 and 39 are provided on one side of the calibration block for cooperative engagement with a pair of set screws 40 and 41 threadedly received in tapped holes 42 and 43 in the housing member 16.

When the torque wrench 10 is initially assembled, the holes 42 and 43 are open, and using a standard or reference torque meter the set screws 40 and 41 are selectively tightened to longitudinally move the calibrating block 15 in either the forward or rearward direction to precisely calibrate the wrench. For example, in order to move the calibrating block 15 in a forward direction to decrease the reading on the indicating assembly 13 for a predetermined torque measurement, the set screw 40 is loosened and the set screw 41 is tightened whereby the frustoconical end surface thereof cooperates with the inclined plane surface 39 to move the block 15 in a forward direction. When the block has thus been precisely positioned to accurately calibrate the wrench, the other set screw 40 is tightened to fixedly lock the block 15 in place. The holes 42 and 43 are then preferably plugged with a solder or other material to complete the final assembly. No further calibration is normally required during the life of the wrench. Should, however, furthe calibration be required the solder plugs may be removed and the set screws 40 and 41 used to adjust the position of the calibrating block.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A torque measuring wrench of the type including an elongated housing having a socket rotatably supported near one end and a spring bar connected between said socket and a remote location in said housing for controllably resisting relative rotation between said socket and said housing, and torque indicating means responsive to the angle of rotation between said socket and said housing, the improvement comprising
 a calibration member having a bore therein slidably receiving said spring bar,
 said calibration member being slidably mounted in said housing for movement along the longitudinal axis of said spring bar,
 said calibration member having external surface portions sloping in opposite directions relative to said axis, and
 a pair of adjusting and locking members carried by said housing at fixed positions along said axis and adjustably movable in transverse directions relative to said axis into respective engagement with said sloping surface portions,
 whereby said adjusting and locking members are used to adjust the effective length of said bar by moving said calibration member along said axis and to lock said calibration member in the adjusted position.

2. The combination set forth in claim 1 wherein said adjusting and locking members are set screws accessible from the outside of said housing during calibration of said wrench.

3. The combination set forth in claim 1 wherein the bore in said calibration member has an intermediate portion of reduced diameter and narrow width providing a pivot area about which said bar may pivot.

4. The combination set forth in claim 3 wherein said bore includes inwardly divergent sections opening at the respective ends of said calibration member for permitting pivotal movement of said bar in said calibration member.

* * * * *